(No Model.)

C. SONNESEN.
DEVICE FOR REMOVING SKINS FROM ORANGES, &c.

No. 533,504. Patented Feb. 5, 1895.

UNITED STATES PATENT OFFICE.

CHRISTIAN SONNESEN, OF TORRINGTON, CONNECTICUT.

DEVICE FOR REMOVING SKINS FROM ORANGES, &c.

SPECIFICATION forming part of Letters Patent No. 533,504, dated February 5, 1895.

Application filed April 12, 1894. Serial No. 507,231. (No model.)

*To all whom it may concern:*

Be it known that I, CHRISTIAN SONNESEN, a citizen of the United States, and a resident of Torrington, in the county of Litchfield and State of Connecticut, have invented a certain new and useful Improvement in Devices for Removing the Skin from Oranges, &c., of which the following is a description.

This invention relates to a tool for removing the skin from oranges, lemons, or the like.

The object of the invention is to produce a tool of the above description which may be made so that it may be carried in the pocket as an ordinary pocket knife, and which will expeditiously remove the skin from the oranges without soiling the fingers or clothing.

The invention consists in the novel construction and combination of parts of an orange peeler, as will be hereinafter fully described and claimed.

Figure 1:
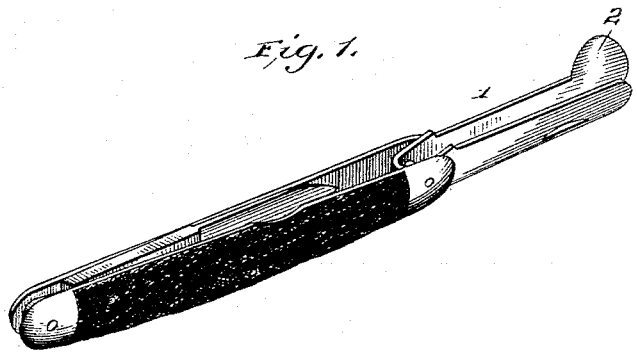
Figure 2:
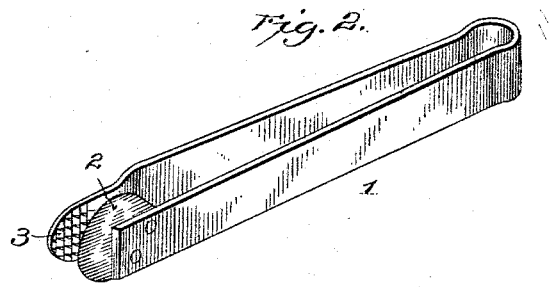
Figure 3:
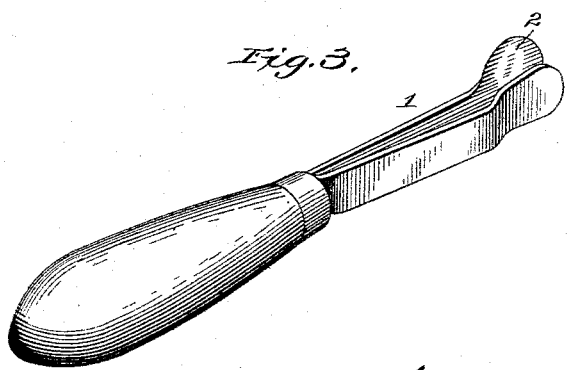

In the accompanying drawings forming a part of this specification, and in which like numerals of reference indicate corresponding parts, Figure 1, is a perspective view of the orange peeler, showing the same arranged within a handle, and adapted to be closed after the manner of a blade of an ordinary pocket knife. Figs. 2 and 3 are similar views of modified forms.

Referring to the drawings, 1 designates the peeler which consists preferably of a single piece of metal bent into U-shape to form two arms or members extending parallel with each other. At the outer end of one of the arms is formed a cutting edge or lancet 2, which may be of any desired configuration, and formed integral with the arm, or secured thereto as shown in Fig. 2. The latter structure is preferable in most instances from the fact that when formed integral with the arm the device would be practically worthless when the lancet is worn away, whereas by having the lancet made of a separate piece it may be replaced when worn out. The other member of the device is provided on its inner surface with a corrugated or roughened surface 3 which is designed to contact with the inner surface of the lancet in order to grasp the skin when being torn from the orange or the like. As shown, the gripping surface is arranged at a slight angle to the member proper, in order to allow a space between the two members when closed practically equivalent to the thickness of the skin. If desired, the inner surface of the lancet may also be roughened, but under ordinary circumstances it will be found unnecessary.

The peeler is suitably pivoted within a handle 4 after the manner of an ordinary knife blade, and if desired may be used in connection with other blades, so that it will in one sense form a combination knife, or if desired it may be pivoted alone in the handle. The handle is provided with a suitable spring bearing upon the end of the peeler, and operates in the same manner as the ordinary handle spring in a knife.

In Fig. 2, the peeler is shown as constructed of a single piece of metal without any handle, and in Fig. 3, of two pieces of metal secured within an ordinary wooden handle. The mechanism for removing the skin and the lancet is the same in these modifications as that shown in Fig. 1.

In operating the device the skin of the orange is first cut by the lancet in any desired manner, and the point of the lancet is then inserted under the skin, and the two members are then closed, thus gripping the skin firmly when it may be stripped from the orange.

Having thus fully described my invention, what I claim as new, and desire to secure by Letters Patent, is—

1. A device for removing the skin from oranges or the like, consisting of a piece of metal bent into U-shape, the outer end of one of the arms or members being provided with a lancet or cutting edge, and the other member on its inner suface with a roughened surface adapted to co-act with the side of the lancet for removing the skin.

2. A device for removing the skin from oranges or the like, consisting of a piece of metal bent into U-shape, and provided on one of its arms or members with a removable cutting edge, and on its other member with a gripping surface adapted to co-act with the side of the lancet for removing the skin from the orange.

In testimony whereof I hereunto affix my signature in the presence of two witnesses.

CHRISTIAN SONNESEN.

Witnesses:
JOHN W. BROOKS,
ISAAC W. BROOKS.